United States Patent [19]

Kramer

[11] 4,290,505

[45] Sep. 22, 1981

[54] PIN CENTERED BRAKE

[75] Inventor: Louis T. Kramer, Long Beach, Calif.

[73] Assignee: McDonnell Douglas Corp., Long Beach, Calif.

[21] Appl. No.: 89,548

[22] Filed: Oct. 29, 1979

[51] Int. Cl.³ .............................................. B60T 1/06
[52] U.S. Cl. ................................ 188/18 A; 188/71.5; 188/73.45; 244/111
[58] Field of Search .................. 188/18 A, 71.1, 71.5, 188/72.4, 73.3, 366, 368, 369; 244/110 A, 110 H, 111; 301/6 A, 6 E

[56] References Cited

U.S. PATENT DOCUMENTS

| | | | |
|---|---|---|---|
| 2,174,408 | 9/1939 | Farmer | 188/71.5 |
| 2,756,844 | 7/1956 | Chamberlain et al. | 188/73.3 |
| 2,778,452 | 1/1957 | Dasse | 188/366 |
| 2,960,290 | 11/1960 | Lucien | 244/111 |
| 3,138,406 | 6/1964 | Chamberlain | 188/18 A |
| 3,352,382 | 11/1967 | Hayes et al. | 188/73.3 |
| 3,388,774 | 6/1968 | Burnett | 188/205 |
| 3,406,792 | 10/1968 | Kennel | 188/73.3 |
| 3,482,654 | 12/1969 | Abu-Akeel | 188/71.5 |
| 3,482,655 | 12/1969 | Walther | 188/73.3 |
| 3,498,418 | 3/1970 | Dewar | 188/72.4 |
| 3,517,778 | 6/1970 | Knapp | 188/73.3 |
| 3,677,372 | 7/1972 | Burnett | 188/73.3 |
| 3,682,277 | 8/1972 | Brown | 188/73.3 |
| 3,688,876 | 9/1972 | Hirai et al. | 188/73.3 |
| 3,977,631 | 8/1976 | Jenny | 244/111 |
| 4,049,086 | 9/1977 | Rath | 188/73.3 |

FOREIGN PATENT DOCUMENTS 1945572  4/1971  Fed. Rep. of Germany ..... 188/73.3

Primary Examiner—Edward R. Kazenske
Attorney, Agent, or Firm—Paul T. Loef; George W. Finch; Donald L. Royer

[57] ABSTRACT

An aircraft brake which is circumferentially disposed about the aircraft axle and supported at two points symmetrical about a line perpendicular to a center line drawn through the aircraft axle. Clearance between the brake housing and the axle in the direction of the reacting couple to the braking load is essential in the geometry of mounting the brake to the shock strut and axle structure.

10 Claims, 4 Drawing Figures

PIN CENTERED BRAKE

BACKGROUND OF THE INVENTION

This invention pertains to aircraft brakes, and more particularly to the geometry of the mounting of the multiple disc aircraft brake to the shock strut and axle structure.

Currently there are two general structural systems employed to transmit the brake torque generated in multiple disc aircraft brakes into the shock strut structure. In both of these systems the wheel axle is integral with and generally perpendicular to the shock strut piston although not necessarily in the same plane. In the first of these systems the brake is joined to the axle by a torque resistant connection such as splines or a flange bolt circle. In the second of these systems, the brake is prevented from rotating on the axle by a single link, pin or key connection to the shock strut structure. The link, pin or key connection acts at a considerable radius from the axle centerline. The brake torque is then reacted by a couple, equal and opposite forces, acting at the wheel axle and at the point the single link, pin or key attaches to the brake.

Both of the specific types of connectors suggested in the first system are readily adaptable to the space envelope available for the brake installation. However, both the splines and flange bolt circle expose the axle to high temperatures and permit no air circulation between the inside diameter of the brake and the outside diameter of the axle. Spline connections, while providing a true quick-change brake, suffer from high vulnerability to damage and high cost. The flange bolt circle attachment has very poor maintainability due to the large number and inaccessability of the bolts. The second of the prior art methods for transmitting brake torque into the landing gear structure, suggested above, has excellent maintainability and is relatively free of the above axle problems. However, this brake is particularly adaptable to bogie type landing gears and frequently cannot be applied in a practical manner to conventional landing gears.

It is an object of this invention to combine the advantages of the two alternate structural systems, discussed above, in a single system and additionally, provide better cooling to the brake discs.

More specifically, the object of the present invention is to provide a mounting for an aircraft type brake, circumferentially disposed about the wheel axle, which:

transmits or reacts the brake torque at only two points,
 provides air cooling circulation between the axle and brake,
 isolates the wheel axle from the brake heat,
 is simple and economical,
 is readily accessible for maintenance, quick change,
 provides a replacable interface should the torque reacting surfaces be damaged in any way, but particularly from fretting corrosion,
 and being symmetrical, installs on either side of the strut or dual-wheeled gears without disturbing the vertical axis of the brake and without need for special adaptors or optional hydraulic ports.

SUMMARY OF THE INVENTION

In summary, the brake of this invention accomplishes the above objects and overcomes the disadvantages of the prior devices by providing support for an aircraft wheel brake which is circumferentially disposed about the aircraft axle. Support is provided at two points symmetrical about a line perpendicular to a centerline drawn through the aircraft axle while the brake housing is unrestrained by the axle which insures that the reacting couple acts between the two pins and not between the axle and one of the pins. The brake may be centered by another flange located on the side of the brake housing opposite of the two point support, which bears against the axle. The centering flange is provided with a plurality of holes to permit cooling air to circulate through the brake.

BRIEF DESCRIPTION OF THE DRAWINGS

With reference to the drawings, wherein like reference numerals designate like portions of the invention.

DESCRIPTION OF THE PREFERRED EMBODIMENT

Figure 1:
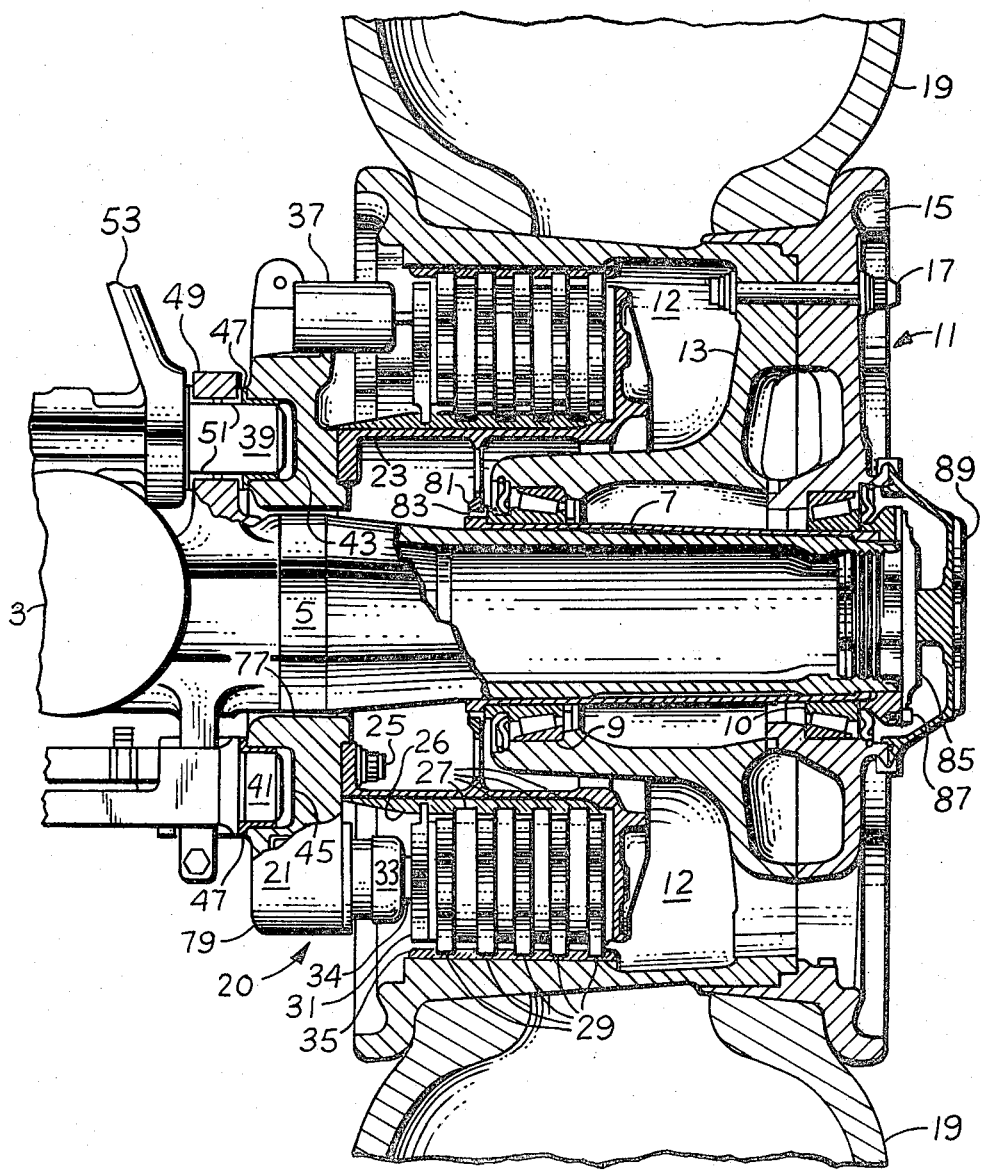
FIG. 1 is a view looking down the shock strut piston with the brake and wheel and part of the axle in section to better shown the mounting method of this invention.

The invention in its preferred embodiment is shown in a typical aircraft installed configuration in FIG. 1. The view is looking down the shock strut piston 3 which, of course, slidably engages the shock strut cylinder, not shown. Integral with the shock strut piston 3 is the wheel axle 5 which is protected by sleeve 7 which in turn supports a pair of tapered roller bearings 9 and 10. Tapered bearings support the wheel 11 which consists of a male portion 13 and a female portion 15 joined by a plurality of fasteners 17. Tire 19 is shown in part, mounted on the wheel 11. The brake assembly 20 is shown nested in the inner cavity 12 of the male portion 13 of the wheel 11.

The brake assembly shown herein is not new and novel, was invented by others, and is not claimed other than in combination. The invention herein, as claimed, applies to the unique geometry of mounting the brake assembly to the shock strut and axle structure.

Brake assembly 20 consist of a mounting plate 21 which is attached to the reaction member 23 by a plurality of fasteners 25. The outside diameter of the reaction member 23 is provided with a spline surface at 26 which supports the brake discs noted as 27 as well as the pressure plate 31. The inside diameter of the male portion 13 of the wheel assembly 11 is also provided with longitudinal splines at 35 which engage the alternate wheel discs 29. When the brake cylinder assemblies 33, which are equally spaced about the face of the mounting plate 21, are actuated, the pistons 34 extend to engage the pressure plate 31 which moves the alternate brake discs and wheel discs along the respective spline surfaces to apply the multiple disc brake. Mechanism 37 acts to separate the discs upon release of the pressure brake cylinder assembly 33.

It should now be apparent that when the tire 19 and wheel 11 are rotating the wheel discs 29 are also rotating. However, the brake discs 27 are stationary as they are fixed via the reaction member 23 and other members, which are the crux of this invention, to the shock strut piston 3. When pistons 35 are extended, forces are applied between the rotating wheel discs 29 and the stationary discs 27 to arrest the wheel 11 and thereby the aircraft. Since the mass and velocity of the aircraft are high, a great deal of energy is absorbed in the brake discs, which generate a great deal of heat. The torsional forces which must be reacted to restrain the brake assembly 20 are very high. In the preferred embodiment the brake torque is reacted by a pair of pins, a fixed pin 39 and the adjustable pin 41. The bores 43 and 45 in the mounting plate 21 of the brake assembly 20 are protected by the bushings 47 which engage the pins 39 and 41 respectively. The particular embodiment shown depicts a dual wheel arrangement with one wheel on either side of the shock strut piston 3. In this embodiment, the pin 39 extends through to the other side of the centerline of the strut 3 to perform a similar function for the second brake. The pin 39 is a close fit in a protruding ear 49 on the axle 5, protected by a pair of bushings 51. The pin 39 is similarly supported in another protruding ear similar to 49 on the other side of the strut 3. In this case, the pin 39 also supports one link of the torque link 53 which is located between the protruding ears 49, the second of which is not shown. The second link of the torque link 53 is connected to the shock strut cylinder (not shown) and functions to prevent the shock strut piston 3 from rotating in the cylinder.

Figure 4:
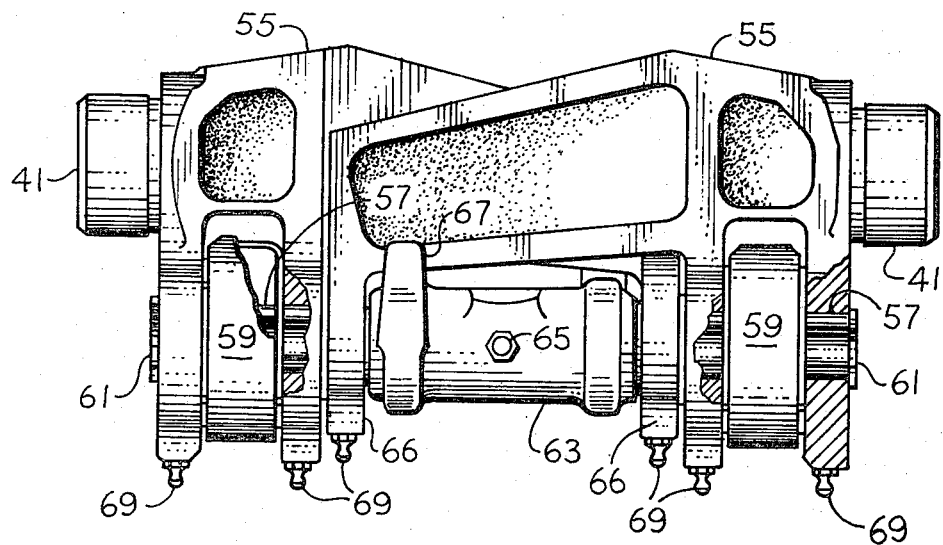
FIG. 4 is an end view of FIG. 2 showing opposing adjustable mounting pins where there is a pair of wheels, one on either side of the shock struct, to shown the symmetry of installation.

The second support pin is an adjustable pin 41. The adjustment mechanism is better shown in FIGS. 2 and 4. The adjustable pin 41 is an integral part of the yoke 55 which in turn rotates about the static pin 57. As in the case of the fixed pin 39, the static pin 57 supports two yokes, one for each brake of the dual wheels located on opposite sides of the strut. A pair of ears 59 (FIG. 4) integral with the shock strut are in-line bored to support the pin 57 which is retained in place by snap rings 61 at either end. Spacer 63 is secured by a through fastener 65 at the mid point of the static pin 57 and in the installed position is located between the alternate inboard ends 66 of the yoke 55. The spacer 63 contains a stop 67 which prevents the yokes 55 from rotating totally out of position. It should now be clear that the adjustable pin 41 rotates about the static pin 57 to allow for nominal tolerances in the mounting bores 43 of the brake assembly 20 and also accommodates any differential expansion due to the great heat generated during heavy braking. The moving surfaces of the yokes 55 are provided with grease fittings 69 for easy rotation.

Figure 2:
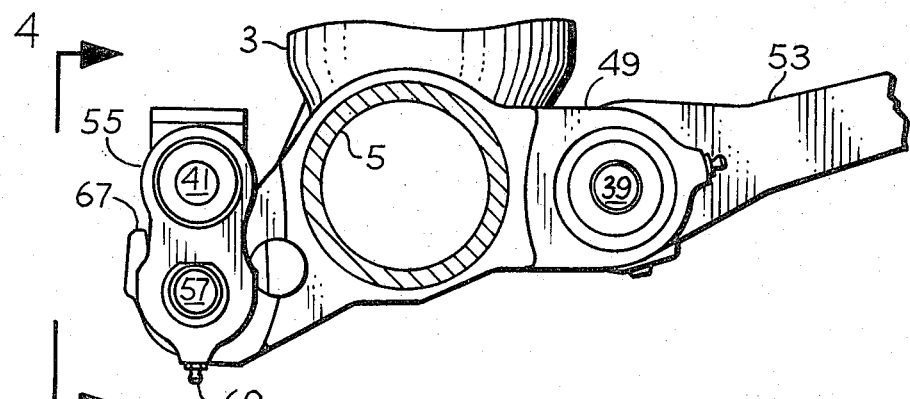
FIG. 2 is a view looking into the wheel axle, in section, with the brake and wheel removed to show the preferred embodiment for accommodating tolerances between the two mounting pins.
Figure 3:
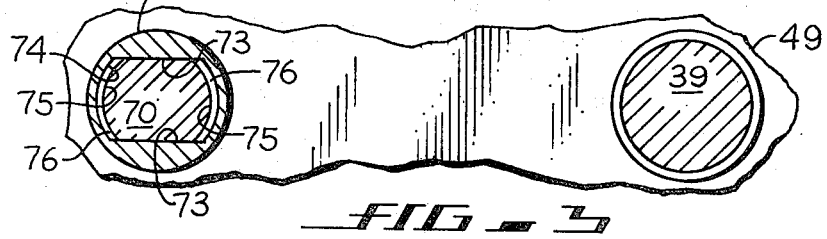
FIG. 3 is an alternate embodiment of the preferred embodiment shown in FIG. 2 except that it is shown in section and in enlarged scale for clarity.

An alternative embodiment for the adjustable pin is shown in FIG. 3 in slightly larger scale than that of FIG. 2. Pin 39 is fixed as previously described. The adjustability of the second pin is provided by a cylindrical insert 71 in the bore 45 of the mounting plate 21 of the brake assembly 20. In this embodiment, the adjustable pin portion previously identified as 41 of the yoke 55 need be modified. The required modification provides parallel flat surfaces 73 and the cylindrical insert 71 is provided with a slotted aperture 74 which provides a net fit against the flat surfaces 73 of the modified pin 70 and a clearance fit against the opposing cylindrical surfaces 75 of the pin 70. The amount of the clearance indicated at 76 dictates the amount of the tolerance which may be absorbed.

The two support points for the brake need not be pins at all and could very well be lugs on the shock strut engaging complementary receiving parts on the brake assembly. However, in any embodiment, it is essential that clearance be provided between the axle 5 and the axle bore 77 at least in the direction perpendicular to a line drawn between the centers of the two supporting pins 39 and 41 in the preferred embodiment. This clearance is essential to prohibit the couple from acting between the brake housing and the axle and one of the support points. In the case of the shear lugs, discussed above, the brake assembly could register on flats parallel to a line drawn perpendicular to a line between the centers of the support points provided clearance is ensured in the direction of the line itself. The two pins 39 and 41 in the preferred embodiment and their equivalents in the alternative embodiments are parallel to the axle 5 and are preferably, but not necessarily, in a common plane with this axle. Although preferably, the plane of the pins need not necessarily be horizontal. While not shown in the drawings, the brake is provided with a bleed port which must be at or near the top of the brake when installed on the axle. Also not shown are the hydraulic ports for actuation of the brake. As a practical matter, horizontal orientation of the pins permits the brake to be installed on either side of the strut without adapters and to maintain the bleed on the top side.

The two pins center the shock strut side 79 of the brake 20 and provide a torque anchor for the brake. Since the two pin supports do not provide a positive connection between the shock strut piston 3 and the brake 20 and, further, it may be undesirable to cantilever the entire disc pack, the reaction member 23 provides a second support point. The brake is centered and supported by a bearing flange 81 which is supported by a teflon type bearing 83 against the axle sleeve 7. The load at this point is quite small and the bearing flange 81 may be readily perforated to supply a clear path for cooling air to cool the brake disk, axle and wheel. The inner race of the tapered roller bearing 9 rides against the teflon bearing 83 which forces the brake assembly 20 into engagement with the pins 39 and 41. The wheel 11 and the other tapered roller bearing 10 complete the stack and are retained in place by the nut 85 which has a suitable locking device 87 and the axle is covered with the hub cap 89. Shaft seals are shown as required to protect the bearings.

It may thus be seen that the brake mounting arrangment, depicted in the several embodiments of this invention, serve to solve the indicated problems encountered in the environment of normal aircraft brake use.

What is claimed is:

1. An improved multiple disc aircraft wheel brake circumferentially disposed in a complete annulus about an aircraft axle and having a brake housing attached to aircraft landing gear structure, a plurality of brake discs rotationally fixed to said housing while axially moveable, a plurality of wheel discs located alternately and adjacently to said brake discs and radially fixed to an aircraft wheel while axially moveable, means to axially engage the brake discs with the wheel discs, wherein the improvement comprises:

attachment of said brake housing to said aircraft landing gear structure by only two pins attached to said landing gear structure and extending parallel to the axis of said axle, said two pins being located on a centerline coincident with the diameter of said axle and being symmetrical about a line drawn through the center of said aircraft axle and perpendicular to said centerline, said two pins slideably engaging mating apertures in said brake housing so that said two pins provide radial restraint while providing axial freedom for said brake housing, said brake housing unrestrained by said axle, and said wheel and said brake housing being retained on said axle in an axially stacked fashion by only a single fastener secured to said axle.

2. The aircraft brake attachment as set out in claim 1 wherein said aircraft wheel is mounted on bearings having an inner and outer race, said two pins are cylindrical pins in said aircraft structure engaging said mating apertures in said brake housing, said brake housing having a support point contacting said aircraft axle and engaging said aircraft wheel bearing inner race, said fastener retaining said wheels, said bearings, and said brake housing in said axially stacked fashion.

3. The aircraft brake attachment as set out in claim 2 wherein said fastener is a single nut threadably engaging said axle whereby to provide a true quick-change brake assembly.

4. The aircraft brake attachment as set out in claim 3 wherein one of said pins is mounted on a rotatable link pivotally connected to said aircraft structure whereby the distance between said two pins is adjustable.

5. The aircraft brake attachment as set out in claim 3 wherein one of said pins is provided with a pair of parallel flats with said flats oriented parallel to a line drawn between the centers of said two pins, a slotted spacer having a cylindrical outer surface and provided with an aperture having parallel flat sides joining cylindrical portions to match and engage said one of said pins, a clearance being provided between said cylindrical portions of said aperature and said one of said pins to accommodate tolerance in the spacing between said pins.

6. An aircraft wheel brake which is circumferentially disposed in a complete annulus about an aircraft axle attached to aircraft shock strut structure comprising:

only two pins installed in said aircraft structure and protruding from said structure parallel to the axis of said axle, said two pins being located on a centerline coincident with the diameter of said axle and being symmetrical about a line drawn through the center of said aircraft axle and perpendicular to said centerline;

a brake housing having two mating apertures to slideably engage said pins so as to provide radial restraint to braking torque while providing axial freedom for said brake housing, a clearance bore to clear said aircraft axle and a flange containing a bearing surface located near the end of said brake housing opposite said two apertures and engaging said axle;

brake means located in said brake housing having at least two engaging brake elements, the first of which engages said brake housing and the second which engages an aircraft wheel;

said wheel mounted on bearings, having an inner and outer race, on said aircraft axle, with said inner race bearing against said brake housing flange in a stacked arrangement; and said wheel, said wheel bearings, and said brake housing being retained on said axle in an axially stacked fashion by only a single fastener secured to said axle.

7. The aircraft wheel brake as set out in claim 6 wherein said brake housing flange is provided with a plurality of apertures so as to permit air to circulate through said brake.

8. The aircarft wheel brake as set out in claim 6 wherein one of said two pins is provided with means for adjustment to accommodate tolerances and differential expansion between said pins and said apertures in said brake housing.

9. The aircraft wheel brake as set out in claim 8 wherein said means for adjustment of one of said two pins is provided by mounting one of said pins to a rotatable link pivotally connected to said aircraft structure.

10. The aircraft wheel brake as set out in claim 8 wherein said fastener retaining said wheel and said brake to said axle is a threaded nut, engaging and locked to the outer end of said aircraft axle.

* * * * *